(12) United States Patent
Palum et al.

(10) Patent No.: US 7,577,311 B2
(45) Date of Patent: Aug. 18, 2009

(54) COLOR FRINGE DESATURATION FOR ELECTRONIC IMAGERS

(75) Inventors: Russell J. Palum, Rochester, NY (US); Bruce H. Pillman, Rochester, NY (US); Lynn V. Larsen, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 835 days.

(21) Appl. No.: 11/121,324

(22) Filed: May 3, 2005

(65) Prior Publication Data

US 2006/0251322 A1 Nov. 9, 2006

(51) Int. Cl.
 *G06K 9/40* (2006.01)
 *G06K 9/00* (2006.01)
 *G06K 9/38* (2006.01)
 *G06K 9/42* (2006.01)
 *G06K 9/44* (2006.01)
 *G03F 3/08* (2006.01)
 *G09G 1/02* (2006.01)

(52) U.S. Cl. .................. 382/275; 382/167; 382/257; 382/266; 382/270; 382/274; 358/523; 345/28

(58) Field of Classification Search .............. 382/167, 382/275
See application file for complete search history.

(56) References Cited

U.S. PATENT DOCUMENTS 5,832,134 A * 11/1998 Avinash et al. .............. 382/257

6,058,218 A * 5/2000 Cline ......................... 382/254
6,741,755 B1 * 5/2004 Blake et al. ................. 382/284
2006/0017855 A1 * 1/2006 Yamada ...................... 348/650
2007/0035641 A1 * 2/2007 Yamada et al. .............. 348/241

FOREIGN PATENT DOCUMENTS

| EP | 0441499 | 4/1997 |
|---|---|---|
| EP | 0439333 | 12/1997 |

OTHER PUBLICATIONS

Underwood et al., "Color Subtractive-Computer-Assisted Image Analysis for Quantification of Cutaneous Nerves in a Diabetic Mouse Model", The Journal of Histochemistry & Cytochemistry, vol. 49, No. 10, 2001, pp. 1285-1291.*

* cited by examiner

*Primary Examiner*—Brian P Werner
*Assistant Examiner*—Jose M Torres
(74) *Attorney, Agent, or Firm*—Raymond L. Owens (57) ABSTRACT

A method for correcting colored fringe artifacts in a region of an image around saturated pixels captured by an electronic imager associated with a color filter array, includes providing a threshold map of the image based on thresholding one or more color channels with a common or separate threshold value for each color channel; providing a first edge map by dilating the threshold map as a function of the color fringe width, producing a first dilated threshold map and subtracting the threshold map from the first dilated threshold map; and color-desaturating image pixels that correspond to the first edge map.

15 Claims, 9 Drawing Sheets

| GoR | R | GoR | R |
|-----|---|-----|---|
| B | GoB | B | GoB |
| GoR | R | GoR | R |
| B | GoB | B | GoB |

COLOR FRINGE DESATURATION FOR ELECTRONIC IMAGERS

FIELD OF THE INVENTION

The invention relates generally to the field of digital image processing, and in particular to the correction of color shifts or fringe artifacts that occur when very light areas are next to dark areas.

BACKGROUND OF THE INVENTION

Many electronic imagers produce a colored fringe around very bright areas in the image. The fringe tends to be magenta or blue although the fringe color may not be limited to these colors. Bright color fringes are particularly prevalent and noticeable in areas where the saturated area is surrounded by a dark area. The problem is common around backlit trees or around the perimeter of specular reflections in jewelry or silverware. The cause is believed to be related to cross-talk due to light piping in the array or due to ray angle.

Cross-talk due to ray angle occurs when a light ray falls on the imager surface at an angle, passes through a CFA patch, and falls on an adjacent pixel associated with a different color CFA patch. Ray angle cross-talk is related to the ratio of the height of the CFA patch over the active area to the pixel pitch. The larger the ratio the larger effect ray angle will have on cross-talk. Cross-talk tends to increase as the pixel pitch gets smaller because the space between the CFA and the active area tends to be larger in proportion to the pixel pitch.

Cross-talk can also be caused by light piping. Light piping occurs when light is trapped in the transparent layer between the imager top surface and the active area below. Light passes through the top surface of the imager, passes through the CFA and other transmissive layers and reaches the photo active area and is reflected toward the top surface of the imager. There is usually some scatter at this reflection. Some of the scattered light hits the top surface layer at an angle large enough that the reflection is substantial. The reflectivity of the surface increases with angle to the normal until critical angle is reached, and then all of the light is reflected back to the active area because of total internal reflection. Some light will be absorbed between the CFA and the active surface, some light will be absorbed by the CFA and some light will be absorbed at the active surface.

This sequence is repeated a number of times until the effect of the scattered light becomes insignificant due to absorption.

Two patents that describe using a brush to "crawl" around and object and change the edges of an image are: EP0439333B1 and EP0441499B1. These patents do not describe how to locate the type of fringe in question and they do not describe how to isolate and mask the fringe.

In this document, arrays are two-dimensional and are in some ways treated as an image. There is exact correspondence between rows and columns in an image and the rows and columns in an array. Similarly, a map is a two-dimensional array of values with exact correspondence between the rows and columns of the map and the rows and columns of the image. The map contains numerically encoded logical information about the pixels in the corresponding image. For example, a value in a map might be set to zero if the pixel with the corresponding row and column is less than a first threshold, the value might be set to one if the pixel with the corresponding row and column is within a range of values, and it could be set to two if the pixel with the corresponding row and column is above a second threshold.

In this document, the meaning of a difference between parameters is not limited to an arithmetic difference. Difference can also mean a difference between a threshold ratio and the ratio of two numbers, or any other difference that makes one parameter different from another.

SUMMARY OF THE INVENTION

It is an object of the present invention to effectively correct or hide colored fringes that occur around very bright areas in the image produced by an electronic imager with a color filter array.

This object is achieved in a method for correcting colored fringe artifacts in a region of an image around saturated pixels captured by an electronic imager associated with a color filter array, comprising:

(a) providing a threshold map of the image based on thresholding one or more color channels with a common or separate threshold value for each color channel;

(b) providing a first edge map by dilating the threshold map as a function of the color fringe width, producing a first dilated threshold map and subtracting the threshold map from the first dilated threshold map; and (c) color-desaturating image pixels that correspond to the first edge map.

The present invention can be embodied in an algorithm that locates saturated areas (in the sense the area is too bright for the sensor dynamic range). These areas are sometimes surrounded by color fringes having incorrectly colored magenta (purple) or blue pixels. The pixels surrounding the saturated areas are mapped using standard image morphological functions and then the color of the edges in the original image are color-desaturated (chroma reduced or chroma set to zero).

An advantage of the present invention is the ability to detect and correct or hide color fringes without producing image artifacts. A further feature of the present invention is that the exact cause of color fringes does not have to be thoroughly understood to suppress color fringes.

DETAILED DESCRIPTION OF THE INVENTION

As used herein the term "saturation" has two meanings. Pixel values can be saturated because too much light has fallen on the pixel and the response reaches a maximum value or the pixel output becomes too non-linear to use. Saturation can also mean a color that is very pure. In this case a completely color-desaturated area is neutral and a very color-saturated area contains high values for one or two system primaries. The term "saturation" by itself will describe pixel values that are at the maximum value. The terms "color-saturation" or "color-desaturation" will be used to describe pure colors or colors at or near neutral gray.

Figure 1:
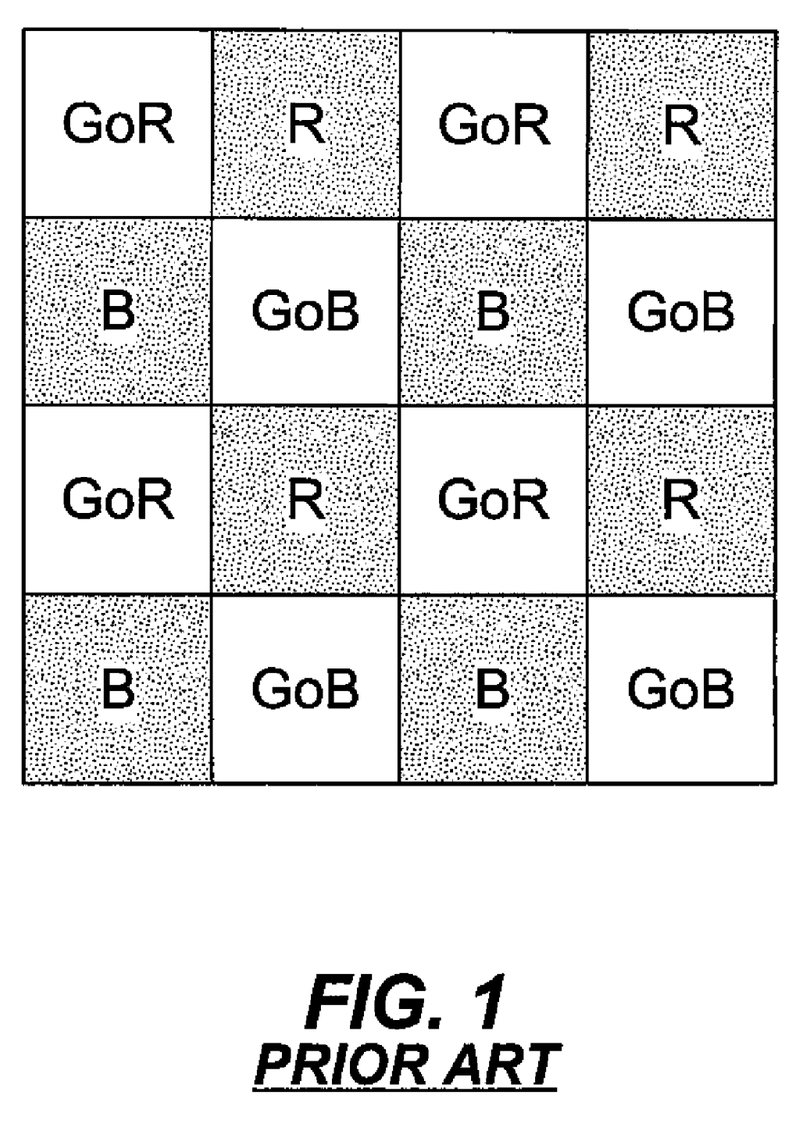
FIG. 1 depicts a prior art Bayer pattern for red, green and blue pixels in a color filter array used in accordance with the present invention.

The preferred embodiment of the present invention starts with a color image. Digital cameras typically produce images from a single imager with a color filter array (CFA). The pattern in FIG. 1 is an example of a prior art Bayer CFA pattern. An imager with this pattern has two green pixels, a red pixel, and a blue pixel in every 2 by 2 block of pixels. Each imager pixel has data for only one color band. This data can be interpolated so that each image pixel has an interpolated value for the 2 alternate color bands. Typically, the image is finished after it is interpolated. Finishing includes the application of matrix and lookup table operations that lead to a standard image metric like sRGB. The color fringe desaturation algorithm will work with finished color images but it is more robust when interpolated imager data is used prior to finishing. It is possible to make the algorithm work with a CFA image without interpolation but a lot more housekeeping is required. The basic algorithm is not dependent on RGB data or on RGB data derived from a Bayer CFA pattern. Cyan, Magenta, Yellow image data or any other CFA pattern that produces a full color image can be corrected with this algorithm. It may be necessary to convert the CFA image to a full color image prior to correction with this algorithm.

Figure 2:
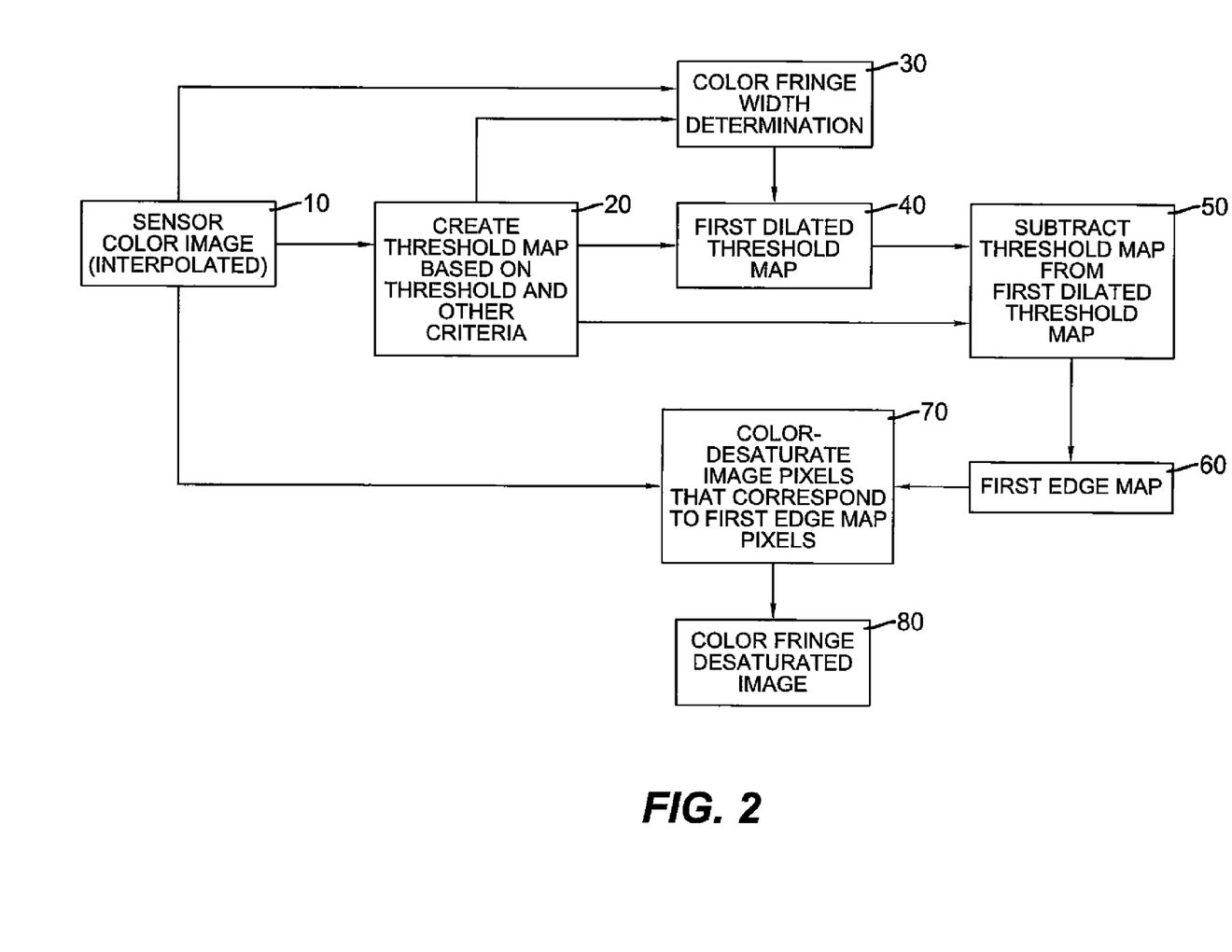
FIG. 2 is a flow diagram showing how saturated areas can be mapped, the edges located on a first edge map, and the color fringes color desaturated.
Figure 6:
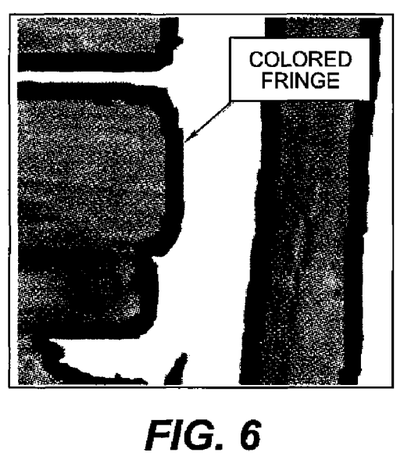
FIG. 6 is a representation of a color image with a color fringe around a saturated area, the dark black line represents the colored fringe.
Figure 7:
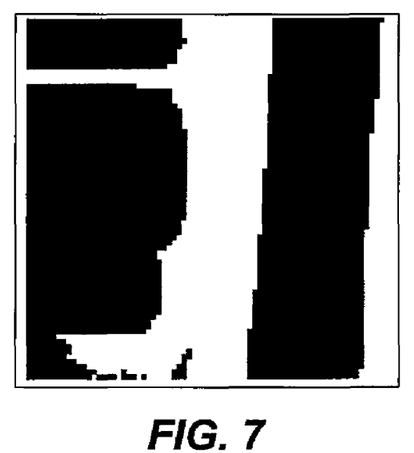
FIG. 7 is a threshold map of the saturated region of the colored image in FIG. 6.

FIG. 2 is a flowchart that shows a basic implementation of the algorithm. The starting point for this algorithm is an interpolated color image, block 10. A grayscale representation of a color image is shown in FIG. 6. In this figure the white region is saturated, the black region represents color fringe, and the gray area represents normal image content. The first step in the algorithm is to map saturated areas of the image, block 20. A threshold value is the criteria for inclusion in the threshold map. The present invention operates on an image captured by an electronic image sensor with a color filter array. The threshold map is based on thresholding one or more color channels with a common or separate threshold value for each of the color channels. FIG. 7 shows an example threshold map.

Figure 5:
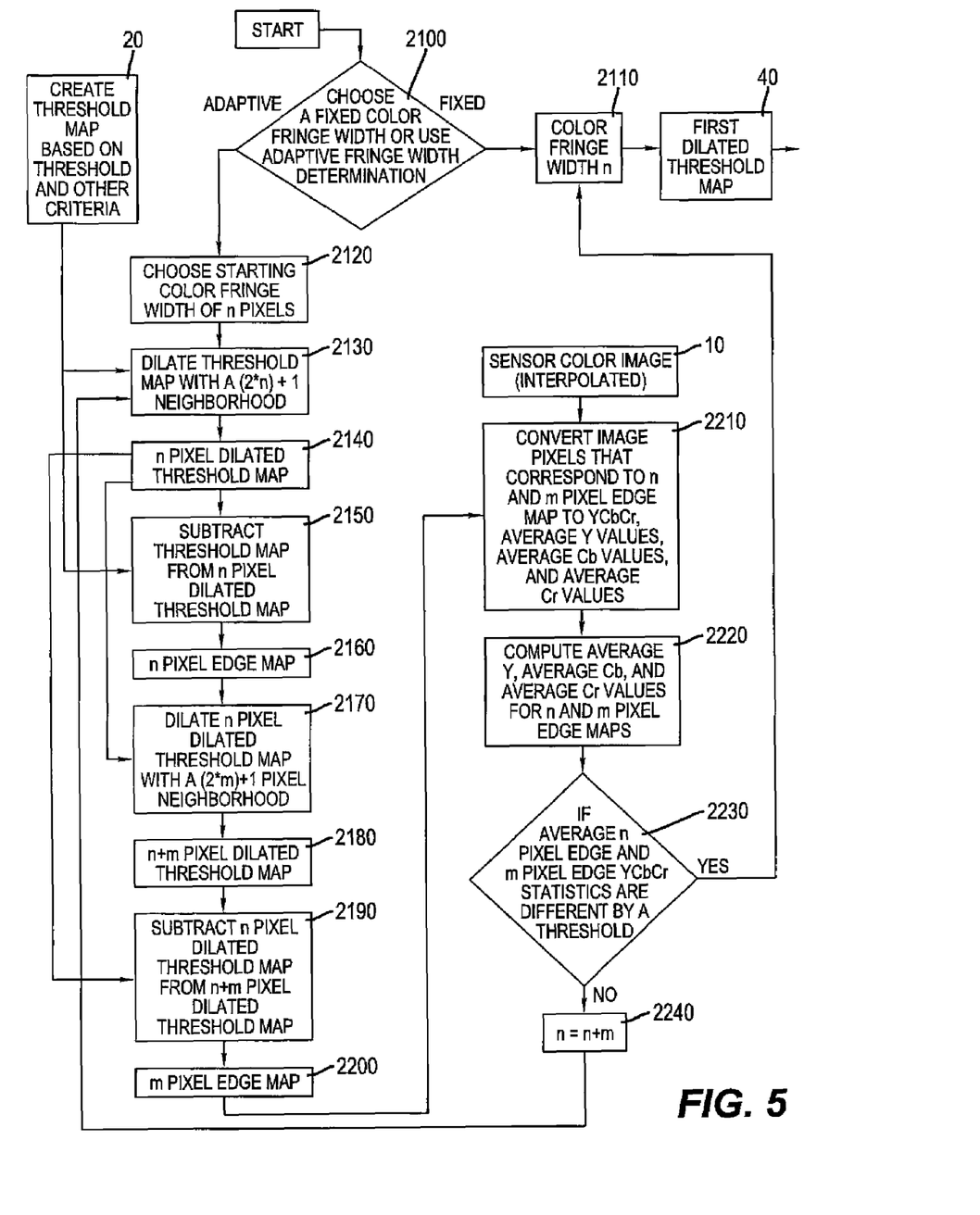
FIG. 5 is a flow diagram showing how the color fringe width can be adaptively determined.
Figure 8:
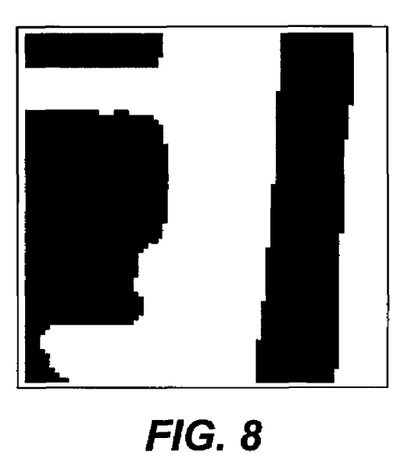
FIG. 8 is the result of dilating the threshold map in FIG. 7.
Figure 9:
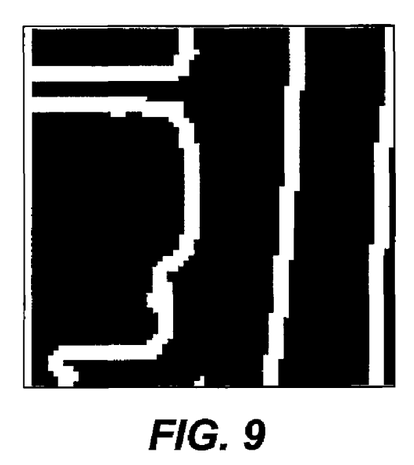
FIG. 9 depicts the first edge map that is the result of subtracting the threshold map in FIG. 7 from the dilated threshold map in FIG. 8.

For a given imager and lens the width of the color fringes tends to be a constant although zoom lens and f-number variation can lead to changes in the color fringe width. The algorithm uses a value for the width of the color fringe. The color fringe width is chosen from a predetermined value or adaptively estimated based on image analysis, block 30. FIG. 5 is an expanded explanation of block 30 and will be discussed in detail later. Once the color fringe width is determined, the threshold map is processed with a grayscale dilation. The result is a first dilated threshold map, block 40. FIG. 8 shows an example first dilated threshold map. The structure element used in the dilation is large enough to increase the size of the mapped area by the nominal width of the color fringe. Typically, the dilation structure element is a disk of diameter $(2*n)+1$, where n is the color fringe width. In FIG. 2 block 50, the threshold map is subtracted from the first dilated threshold map to produce a first edge map of edges around saturated areas, block 60. FIG. 9 shows a sample first edge map produced by subtracting the threshold map in FIG. 7 from the dilated threshold map in FIG. 8. The final step of the algorithm is color desaturation of image pixels corresponding to the first edge map pixels in block 70. The final processed image is represented by block 80.

Figure 3:
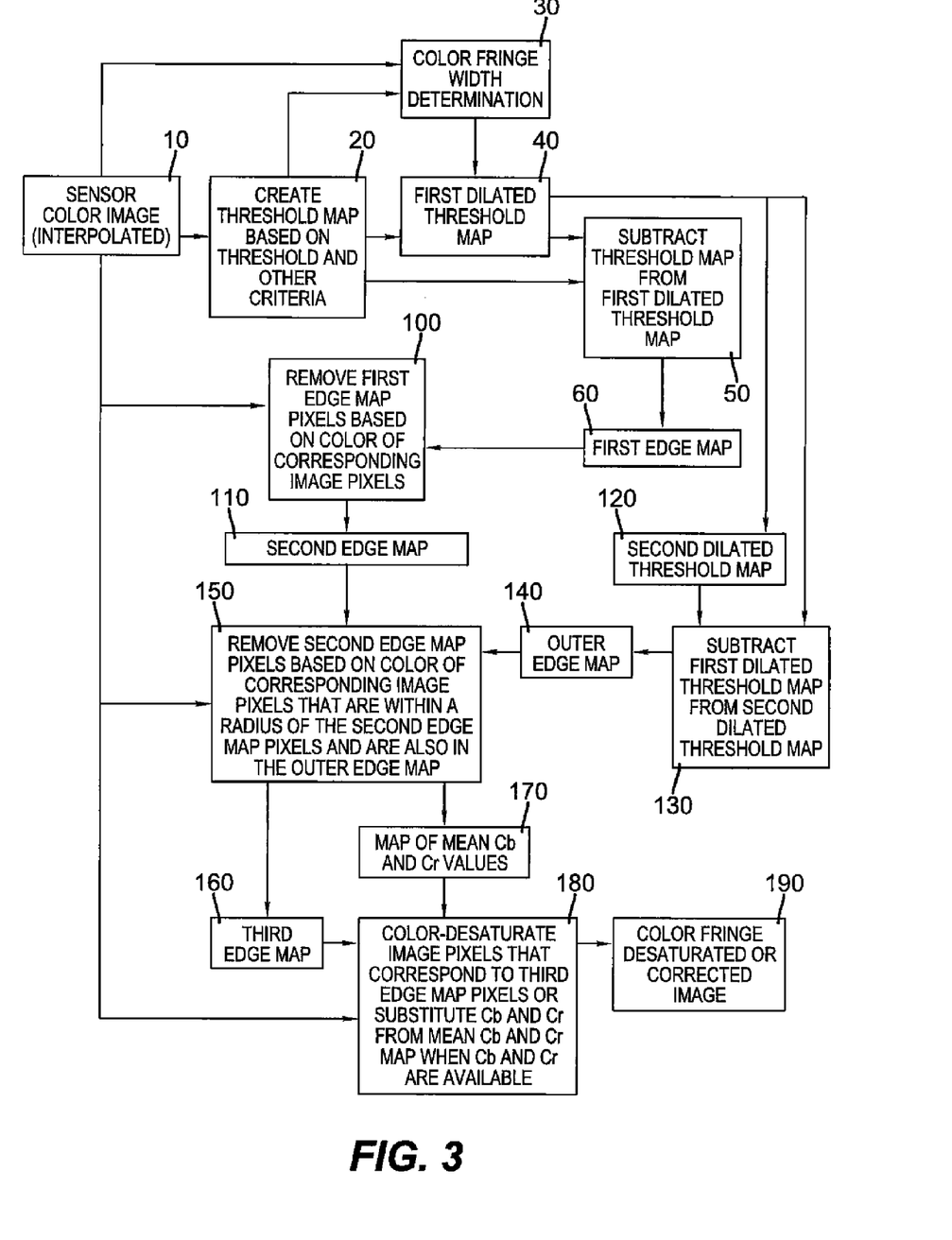
FIG. 3 is a flow diagram showing how saturated areas can be mapped and the color fringe can be desaturated with improved accuracy.

A second preferred embodiment enhances the discrimination of color fringe. A block diagram is shown in FIG. 3. This implementation follows the first implementation through block 60. At block 100 the algorithm takes advantage of additional information about purple fringing. The first edge map is intended to correspond to incorrectly colored pixels that must be color-desaturated. However, it also includes pixels that are correctly colored even though they are adjacent to saturated pixels. Block 100 removes pixels from the first edge map that correspond to image pixels not having the expected fringe color. To help in detecting color fringe pixels, the algorithm converts image pixels that correspond to the first edge map to a luma-chroma color space such as YCbCr. The color of the image pixels can be determined from the Cb and Cr terms. Incorrectly colored pixels have a certain expected range of values for Cb and Cr (usually blue or magenta). First edge map pixels corresponding to image pixels outside the expected range of Cb and Cr are excluded, producing the second edge map, block 110.

The second edge map is then passed to block 150. This block removes more pixels from the second edge map. The pixels removed are ones within the color fringe area that are fringe colored, but in fact represent scene content that truly is fringe colored.

Figure 10:
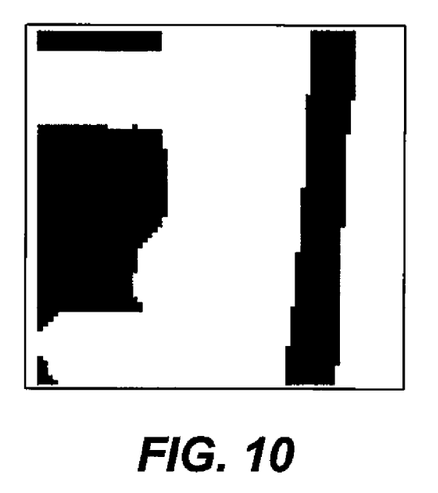
FIG. 10, depicts a twice dilated threshold map that is the result of dilating the dilated threshold map in FIG. 8.
Figure 11:
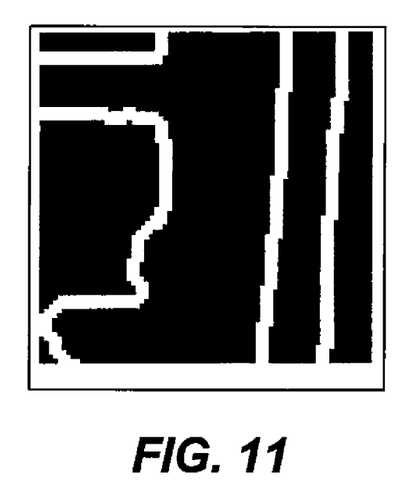
FIG. 11 depicts the outer edge map that is the result of subtracting the dilated threshold map in FIG. 8 from the twice dilated threshold map in FIG. 10.
Figure 12:
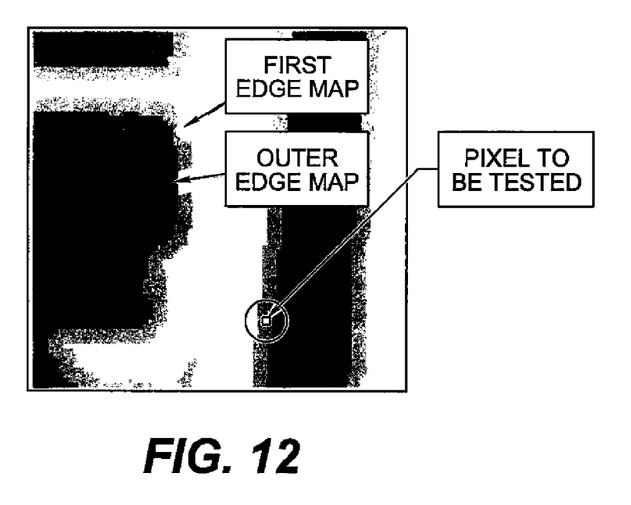
FIG. 12 is a map of the original threshold map, the first edge map and the outer edge map.

To check for these pixels, the first dilated threshold map, block 40, is dilated again, producing a second dilated threshold map, block 120. A sample of a second dilated map is shown in FIG. 10. The first dilated map is subtracted from the second dilated map, in block 130. The resulting map, the outer edge map, is a map of outer edges bordering the color fringe region, shown in block 140. An example of an outer edge map is shown in FIG. 11. FIG. 12 shows all of the edge maps superimposed. The white area corresponds to the saturated area in the original image, the light gray area is the first edge map or second edge map; it corresponds to the pixels that are most likely to be color fringe image pixels. The outer edge map, the darker gray area, corresponds to pixels beyond the color fringe. The width of the outer edge map may be smaller, the same, or larger than the width of the first or second edge map. An arrow in FIG. 12 points to a pixel in the second edge map; this is one of the mapped pixels that will be tested for removal because it may not correspond to a color fringe in the image. All of the pixels in the second edge map are tested for removal in block 150.

For each pixel in the second edge map, nearby pixels are those with row and column coordinates within a specific Euclidean distance of the pixel. The circle in FIG. 12 contains these pixels. The preferred distance limit may be twice the width of the outer edge map, but the distance limit may be larger or smaller. The mean Y, Cr and Cb values are calculated from image pixels that correspond to map pixels that are in the set of nearby pixels and are in the outer edge map. Each second edge map pixel will have a corresponding outer edge mean value for Y, Cr and Cb, provided the set of nearby pixels also includes pixels in the outer edge map. If no nearby pixels are in the outer edge map, the mean Y, Cr, and Cb values of nearby outer edge map pixels will not exist. Each of the pixels in the second edge map is tested by comparing the value of its corresponding image pixel with the mean Y, Cb, and Cr values of nearby outer edge map pixels, if the mean values exist. The second edge map pixels that do not have corresponding Y, Cr, and Cb mean values are retained in the third edge map. A map of mean Cb and Cr pixels, represented in block 170, are set to zero for the edge pixels that do not have a corresponding mean value.

A second edge map pixel under test is retained if it has corresponding outer edge mean values and the mean values are:

1.) Darker than the saturation threshold by a tolerance. This test compares the Y (luma) values of the pixels.
2.) Different in color (allowing some tolerance), from the image pixel corresponding to the test pixel. This criterion indicates that an object with a color similar to the color fringe has been mistaken for a fringe. This test uses the Cb and Cr pixel values.

Second edge map pixels that do not meet these criteria are removed, producing the third edge map, block 160.

Image pixels that correspond to the third edge map, block 160, are corrected in block 180, by being color-desaturated. An alternative for correction in block 180 is to replace the color (Cb and Cr) values for the pixel under test with values from the Cb and Cr map in block 170. The processing in block 180 produces a color fringe desaturated or corrected image, block 190.

The operations applied to the second edge map that lead to the third edge map may also be applied to the first edge map without generating the second edge map; that is, without using processing block 100. This decision depends on the tradeoff between image quality improvement and image processing time.

Figure 4:
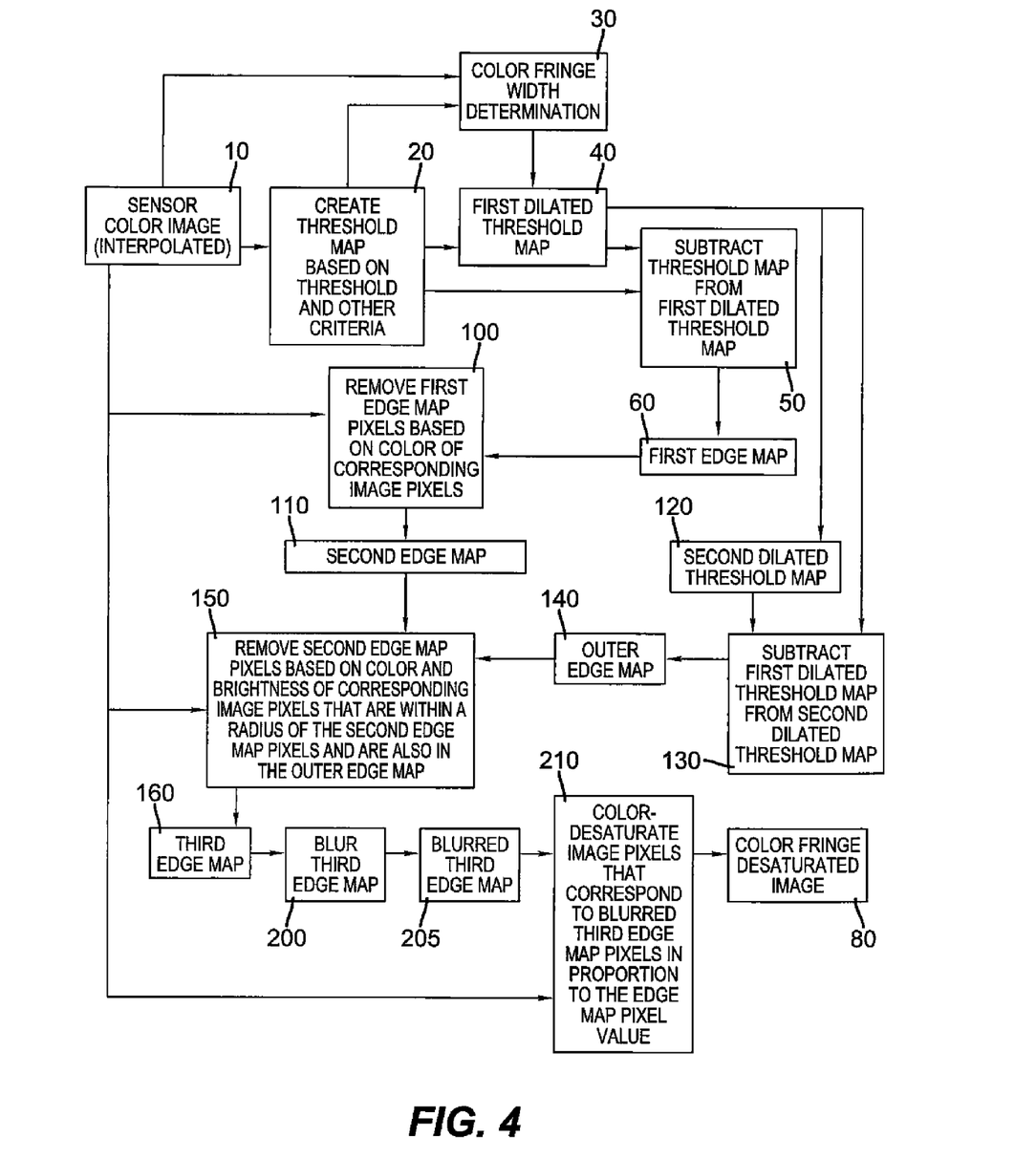
FIG. 4 is a flow diagram showing how saturated areas can be mapped and the color fringe can be desaturated in a smooth way.

A third embodiment is shown in FIG. 4. This implementation is the same as the implementation in FIG. 3 through block 160. At this point the third edge map, block 160, is blurred in block 200. The blurred edge map is block 205. Image pixels corresponding to the blurred third edge map, block 205, are color-desaturated in proportion to a function of the value of the corresponding blurred third edge map pixel values in block 210. This leads to a color fringe desaturated image in block 80 that does not have sharply defined edges between the corrected and non-corrected regions.

In FIGS. 2, 3, and 4, the color fringe width determination was shown as block 30. A more detailed flow of calculation for block 30 is shown in FIG. 5. The technique is described as finding a single width for all the saturated areas in the image, but the saturated regions can be segmented and the color fringe width determined for each segmented saturated region.

Figure 13:
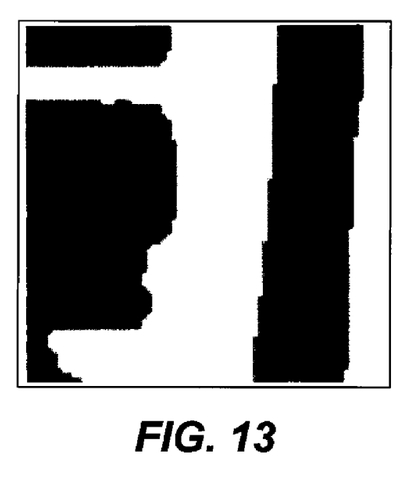
FIG. 13 depicts the result of dilating the FIG. 7 threshold map by 2 pixels.
Figure 14:
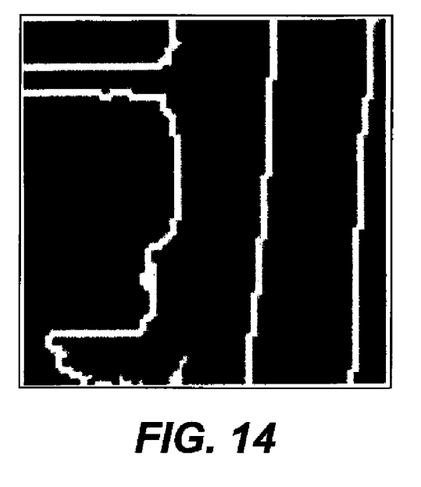
FIG. 14 depicts the 2 pixel wide edge map developed by subtracting the FIG. 7 threshold map from the FIG. 13 dilated threshold map.
Figure 15:
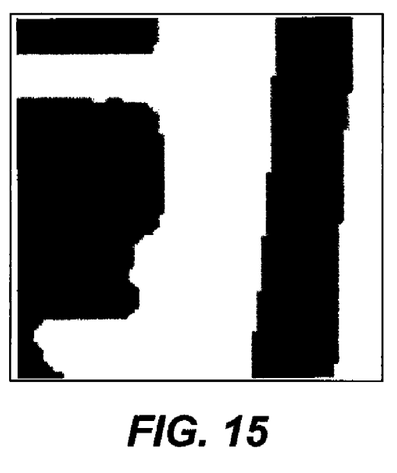
FIG. 15 depicts the result of dilating the FIG. 13 threshold map by 1 pixel.
Figure 16:
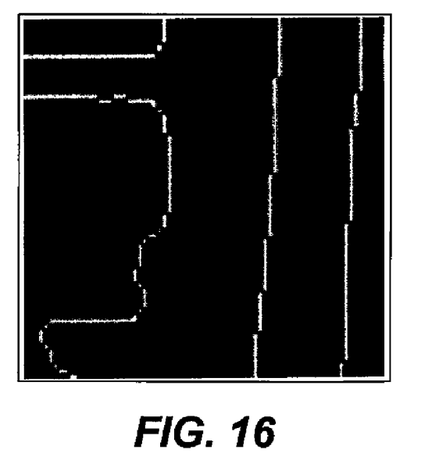
FIG. 16 depicts a 1 pixel wide edge map developed by subtracting the FIG. 13 threshold map from the FIG. 15 dilated threshold map.
Figure 17:
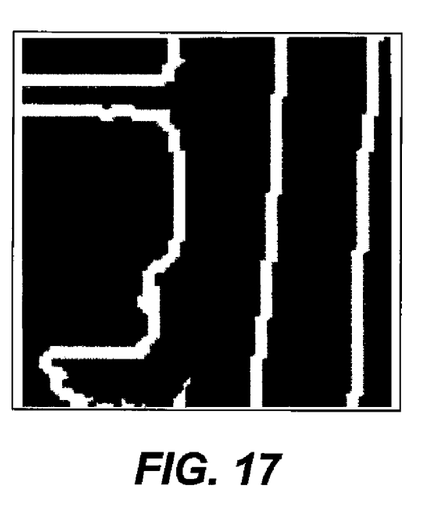
FIG. 17 depicts a 3 pixel wide edge map resulting from dilating the FIG. 7 threshold map by 3 pixels and subtracting the FIG. 7 threshold map.
Figure 18:
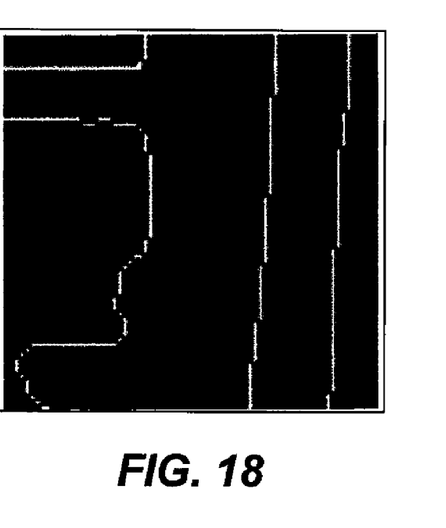
FIG. 18 depicts a 1 pixel wide edge map developed by dilating the FIG. 7 threshold map by 4 pixels and then subtracting the FIG. 17, 3 pixel dilated threshold map.

The inputs required to determine the width of a color fringe are the map of saturated areas, block 20, and the sensor color interpolated image, block 10. The first step in FIG. 5 is the decision block 2100. A fixed, predetermined color fringe width can be used or the adaptive algorithm can be used. If the fixed width is used it is just returned, block 2120. If the adaptive algorithm is used, an estimation process is started. A color fringe width n, smaller than expected color fringe width, is chosen in block 2120. The threshold map is dilated with disk of diameter (2*n)+1, block 2130. A sample of a dilated threshold map is shown in FIG. 13. This is the FIG. 7 threshold map dilated 2 pixels, as for the case where n=2. The threshold map, block 2140, is then subtracted from the n pixel dilated threshold map in block 2150. This produces an n pixel edge map, block 2160. FIG. 14 shows a sample n pixel edge map. The n pixel dilated threshold map is dilated again with a disk of diameter (2*m)+1, block 2170. In this processing block, m is used to produce an incremental increase in the size of the dilated threshold map. The resulting (n+m) dilated threshold map is block 2180. FIG. 15 shows a sample of a (n+m) dilated threshold map where m=1. The variable m is a small integer probably between 1 and 3 but not limited to these values. The n pixel dilated threshold map is subtracted from the n+m pixel dilated threshold map to produce the m pixel edge map, block 2190. The resulting m pixel edge map is block 2200. An example of a m pixel edge map is shown in FIG. 16. Statistics for image pixels that correspond to the n pixel edge map and the m pixel edge map are calculated, as shown in block 2210. The statistics can be but are not limited to the mean and standard deviation of R, G, and B or Y, Cb, and Cr. These statistics are compared in blocks 2220 and 2230. When the statistics are sufficiently different, n equals the color fringe width and the n pixel edge map corresponds only to color fringe pixels. At this point, the value n is sent to block 2110 and returned. If the statistics are not sufficiently different, then n is incremented by m in block 2240 and the process is repeated with a larger dilation neighborhood starting from block 2130. The dilated threshold map in FIG. 17 shows a sample incremented edge map corresponding to block 2130. The m pixel edge map in FIG. 18 shows a sample 1 pixel edge map (for m=1) that surrounds the incremented edge map in block 2200.

The invention has been described in detail with particular reference to certain preferred embodiments thereof, but it will be understood that variations and modifications can be effected within the spirit and scope of the invention.

PARTS LIST

10 Array
20 Threshold map
30 Color Fringe width
40 First dilated threshold map
50 Block.
60 First edge map
70 Block
80 Color fringe desaturated image
100 Block.
110 Second edge map
120 Second dilated threshold map
130 Block
140 Outer edge map
150 Block
160 Third edge map
170 Map of mean Cb and Cr values
180 Block
190 Color fringe desaturated or corrected image.

200 Block
205 Blurred third edge map
210 Block
2100 Block
2110 Fringe width
2120 Block
2130 Block
2140 n pixel dilated threshold map
2150 Block
2160 n pixel edge map

PARTS LIST CONT'D

2170 Block
2180 n+m pixel dilated threshold map
2190 Block
2200 m pixel edge map
2210 Block
2220 Block
2230 Block

The invention claimed is:

1. A method for correcting colored fringe artifacts in a region of a color digital image comprised of a two-dimensional array of image pixels, the colored fringe artifacts occurring round saturated image pixels captured by an electronic imager associated with a color filter array, comprising a processor for performing the following steps:
   (a) providing a threshold map of the image based on thresholding one or more color channels of the color digital image with a common or separate threshold value for each color channel;
   (b) providing a first edge map representing colored fringe pixels having colored fringe artifacts by dilating the threshold map as a function of the width of the colored fringe artifact, producing a first dilated threshold map and subtracting the threshold map from the first dilated threshold map; and
   (c) color-desaturating the colored fringe image pixels that correspond to the first edge map to provide a corrected color digital image having reduced colored fringe artifacts.

2. The method of claim 1 further including providing a second edge map by excluding first edge map pixels that correspond to image pixels outside the expected range of color from the first edge map.

3. The method of claim 1 further including providing a third edge map by dilating the first dilated threshold map producing a second dilated threshold map and subtracting the first dilated threshold map from the second dilated threshold map to produce an outer edge map of image pixels extending beyond the colored fringe pixels, and excluding first edge map pixels based on the values of image pixels corresponding to nearby image pixels in the outer edge map.

4. The method of claim 2 further including providing a third edge map by dilating the first dilated threshold map producing a second dilated threshold map and subtracting the first dilated threshold map from the second dilated threshold map to produce an outer edge map of image pixels extending beyond the colored fringe pixels, and excluding second edge map pixels based on the values of image pixels corresponding to nearby image pixels in the outer edge map.

5. The method of claim 3 further including blurring the first edge map, the second edge map, or the third edge map or combinations thereof, and color-desaturating image pixels as a function of blurred edge map values.

6. The method of claim 1 wherein the width of the colored fringe artifact is an estimate and wherein the dilation in step (b) is a function of the estimated width of the colored fringe artifact.

7. The method of claim 1 where the threshold map is segmented and the width of the colored fringe artifact is estimated for local segments.

8. The method of claim 2 wherein the width of the colored fringe artifact is an estimate and wherein the dilation in step (b) is a function of the estimated width of the colored fringe artifact.

9. The method of claim 2 where the threshold map is segmented and the width of the colored fringe artifact is estimated for local segments.

10. The method of claim 3 wherein the width of the colored fringe artifact is an estimate and wherein the dilation in step (b) is a function of the estimated width of the colored fringe artifact.

11. The method of claim 3 where the threshold map is segmented and the width of the colored fringe artifact is estimated for local segments.

12. The method of claim 4 wherein the width of the colored fringe artifact is an estimate and wherein the dilation in step (b) is a function of the estimated width of the colored fringe artifact.

13. The method of claim 4 where the threshold map is segmented and the width of the colored fringe artifact is estimated for local segments.

14. The method of claim 5 wherein the width of the colored fringe artifact is an estimate and wherein the dilation in step (b) is a function of the estimated width of the colored fringe artifact.

15. The method of claim 5 where the threshold map is segmented and the width of the colored fringe artifact is estimated for local segments.

* * * * *